(12) United States Patent
Aoyama et al.

(10) Patent No.: US 11,180,584 B2
(45) Date of Patent: Nov. 23, 2021

(54) METHOD FOR PRODUCING STYRENE RESIN AND STYRENE RESIN MOLDED ARTICLE

(71) Applicant: IDEMITSU KOSAN CO., LTD., Tokyo (JP)

(72) Inventors: Takuma Aoyama, Tokyo (JP); Kiyohiko Yokota, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/766,513

(22) PCT Filed: Nov. 29, 2018

(86) PCT No.: PCT/JP2018/044100
§ 371 (c)(1),
(2) Date: May 22, 2020

(87) PCT Pub. No.: WO2019/107525
PCT Pub. Date: Jun. 6, 2019

(65) Prior Publication Data
US 2020/0377629 A1  Dec. 3, 2020

(30) Foreign Application Priority Data

Dec. 1, 2017 (JP) .............................. JP2017-232080
Dec. 1, 2017 (JP) .............................. JP2017-232084

(51) Int. Cl.
*C08F 12/08* (2006.01)
*C08F 212/08* (2006.01)
*C08F 112/08* (2006.01)

(52) U.S. Cl.
CPC ............ *C08F 12/08* (2013.01); *C08F 112/08* (2013.01); *C08F 212/08* (2013.01)

(58) Field of Classification Search
None
See application file for complete search history.

(56) References Cited

U.S. PATENT DOCUMENTS 5,391,661 A * 2/1995 Naganuma .............. C08F 10/00
502/102
6,265,493 B1 * 7/2001 Chung .................... C08F 10/00
525/184

FOREIGN PATENT DOCUMENTS

| CN | 103030721 A | | 4/2013 |
|---|---|---|---|
| DE | 10084695 T1 | | 5/2002 |
| JP | H01-294705 A | | 11/1989 |
| JP | H03-70746 A | | 3/1991 |
| JP | H03-109453 A | | 5/1991 |
| JP | 05-338089 A | | 12/1993 |
| JP | 2010-031283 A | | 2/2010 |
| JP | 2013-185075 A | | 9/2013 |
| JP | 2013-189560 A | | 9/2013 |
| JP | 2013185075 A | * | 9/2013 |
| JP | 2013-203877 A | | 10/2013 |

OTHER PUBLICATIONS

Kitiyanan, B. et al. "Effect of Catalyst Loading in Olefin Polymerization Catalyzed by Supported Half-Titanocenes on Polystyrene through Phenoxy Linkage". Studies in Surface Science and Catalysis. 2006, 161, 213-218. (Year: 2006).*

International Searching Authority, "International Search Report," issued in connection with International Patent Application No. PCT/JP2018/044100, dated Feb. 26, 2019.

International Searching Authority, "Written Opinion," issued in connection with International Patent Application No. PCT/JP2018/044100, dated Feb. 26, 2019.

Extended Search Report on EP 18884715.6 dated Jul. 16, 2021 (6 pages).

* cited by examiner

*Primary Examiner* — Richard A Huhn
(74) *Attorney, Agent, or Firm* — Foley & Lardner LLP

(57) ABSTRACT

To provide a method for producing a styrene resin having a syndiotactic structure, including performing addition polymerization of one or more of a vinyl aromatic monomer in the presence of a catalyst containing a half metallocene transition metal compound (A) having at least one kind selected from metals of groups 3 to 5 of the periodic table and lanthanoid transition metals as a central metal, a compound (B) represented by the general formula (1), and a compound (C) selected from at least one kind of an oxygen-containing compound (c1) and a compound (c2) capable of forming an ionic complex through reaction with a transition metal compound, the styrene resin produced having a transition metal content derived from the half metallocene transition metal compound (A) of 1.5 to 12 ppm by mass.

18 Claims, No Drawings

METHOD FOR PRODUCING STYRENE RESIN AND STYRENE RESIN MOLDED ARTICLE

CROSS-REFERENCE TO RELATED APPLICATIONS

The present application claims priority under 37 U.S.C. § 371 to International Patent Application No. PCT/JP2018/044100, filed Nov. 29, 2018, which claims priority to and the benefit of Japanese Patent Application Nos. 2017-232080 and 2017-232084, both filed on Dec. 1, 2017. The contents of these applications are hereby incorporated by reference in their entireties.

TECHNICAL FIELD

The present invention relates to a method for producing a styrene resin and a styrene resin molded article.

BACKGROUND ART

A styrene resin having a syndiotactic structure (which may be hereinafter abbreviated as an SPS resin) has been known to have excellent heat resistance, chemical resistance, molding workability, and the like. The practical realization of an injection molded article thereof is receiving attention in the fields of electric and electronic components, automobile components, machine components, industrial components, and the like, taking advantage of these excellent properties.

PTLs 1 and 2 describe a stretched film containing a styrene polymer having a syndiotactic structure as a major component. It is described that the styrene polymer having a syndiotactic structure described in PTLs 1 and 2 has the particular amount of the residual metal content, and specifically is produced by the method described in PTL 3.

CITATION LIST

Patent Literatures

PTL 1: JP 03-070746 A
PTL 2: JP 03-109453 A
PTL 3: JP 01-294705 A

SUMMARY OF INVENTION

Technical Problem

The production method described in PTL 3 is substantially performed by a bath method in a laboratory scale. Therefore, a styrene resin with high quality cannot be produced efficiently in a large amount, and a method for producing a styrene resin with high quality more efficiently in a large amount has been demanded. PTLs 1 and 2 describe that the residual aluminum content and the residual titanium content are decreased in a film that is applied to a magnetic tape and the like, which is however inferior in efficiency since a decalcification cleaning treatment is required.

There are demands of an injection molded article having the excellent properties of the SPS resin described above, especially the heat resistance, particularly the long-term heat resistance, and the efficient production of the SPS resin as a raw material therefor.

Solution to Problem

The present inventors have found that the problem can be solved by a production method that uses a combination of particular compounds as a catalyst and defining a transition metal content derived from a particular metal compound in the catalyst to a particular amount. It has also be found that the problem can be solved by an injection molded article that has a particular amount of the transition metal content. Accordingly, the present invention relates to the following items [1] to [18].

[1] A method for producing a styrene resin having a syndiotactic structure, including performing addition polymerization of one or more of a vinyl aromatic monomer in the presence of a catalyst containing a half metallocene transition metal compound (A) having at least one kind selected from metals of groups 3 to 5 of the periodic table and lanthanoid transition metals as a central metal, a compound (B) represented by the general formula (1), and a compound (C) selected from at least one kind of an oxygen-containing compound (c1) and a compound (c2) capable of forming an ionic complex through reaction with a transition metal compound, the styrene resin produced having a transition metal content derived from the half metallocene transition metal compound (A) of 1.5 to 12 ppm by mass:

$$((R^1)_3\text{-}Q\text{-}Y)_k\text{---}Z\text{---}(R^2)_{j-k} \tag{1}$$

wherein $R^1$ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j−1).

[2] The method for producing a styrene resin having a syndiotactic structure according to the item [1], wherein the half metallocene transition metal compound (A) is represented by the following formula (2):

$$R^3MU_{a-1}L_b \tag{2}$$

wherein $R^3$ represents a π ligand; M represents at least one kind selected from metals of groups 3 to 5 of the periodic table and lanthanoid transition metals; U represents a monoanion ligand, in which plural ligands represented by U may be the same as or different from each other, and plural ligands represented by U may be bonded to each other via an arbitrary group; L represents a Lewis base; a represents a valence number of M; and b represents 0, 1, or 2, in which in the case where L represents plural groups, the plural groups represented by L may be the same as or different from each other.

[3] The method for producing a styrene resin having a syndiotactic structure according to the item [1] or [2], wherein the central metal of the half metallocene transition metal compound (A) is titanium.

[4] The method for producing a styrene resin having a syndiotactic structure according to the item [3], wherein the transition metal content derived from the half metallocene transition metal compound (A) in the styrene resin produced is titanium.

[5] The method for producing a styrene resin having a syndiotactic structure according to any one of the items [1] to [4], wherein the method further uses a compound (D) represented by the following general formula (3) as a catalyst:

$$R^4_p Al(OR^5)_q X^1_{2-p-q} H \quad (3)$$

wherein $R^4$ and $R^5$ each represent an alkyl group having 1 to 8 carbon atoms; $X^1$ represents a halogen atom; and p and q satisfy $0<p\leq 2$, $0\leq q<2$, and $p+q\leq 2$.

[6] The method for producing a styrene resin having a syndiotactic structure according to any one of the items [1] to [5], wherein the method further uses a compound (E) represented by the following general formula (4) as a catalyst:

$$R^6_m Al(OR^7)_n X^2_{3-m-n} \quad (4)$$

wherein $R^6$ and $R^7$ each represent an alkyl group having 1 to 8 carbon atoms; $X^2$ represents a halogen atom; and m and n satisfy $0<m\leq 3$, $0\leq n<3$, and $m+n\leq 3$.

[7] The method for producing a styrene resin having a syndiotactic structure according to any one of the items [1] to [6], wherein the compound (B) is represented by the general formula (1), wherein Z represents aluminum.

[8] The method for producing a styrene resin having a syndiotactic structure according to the item [7], wherein the styrene resin has a residual aluminum content of 70 to 800 ppm by mass.

[9] The method for producing a styrene resin having a syndiotactic structure according to any one of the items [1] to [8], wherein the styrene resin is produced through powder bed continuous polymerization.

[10] The method for producing a styrene resin having a syndiotactic structure according to any one of the items [1] to [9], wherein hydrogen is added in an amount of 0 to 20-fold in terms of molar ratio based on the central metal of the half metallocene transition metal compound (A).

[11] The method for producing a styrene resin having a syndiotactic structure according to any one of the items [1] to [10], wherein the method does not include a decalcification treatment.

[12] A molded article obtained by injection molding a styrene resin obtained by the production method according to any one of the items [1] to [11].

[13] An injection molded article containing a styrene resin having a syndiotactic structure, having a residual titanium content of 1.5 to 12 ppm by mass.

[14] The injection molded article according to the item [13], wherein the injection molded article has a residual aluminum content of 70 to 800 ppm by mass.

[15] The injection molded article according to the item [13] or [14], wherein the injection molded article contains triphenylmethane.

[16] The injection molded article according to the item [15], wherein the injection molded article contains triphenylmethane in an amount of 10 ppm by mass or more.

[17] The injection molded article according to any one of the items [13] to [16], wherein the injection molded article further contains an antioxidant.

[18] The injection molded article according to the item [17], wherein the antioxidant contains at least one kind selected from a phosphorus antioxidant, a phenol-based antioxidant, an amine antioxidant, and a sulfur antioxidant.

Advantageous Effects of Invention

According to the production method of the present invention, an SPS resin that is optimum for producing an injection molded article excellent in long-term heat resistance can be efficiently mass produced by a continuous method. The molded article obtained by injection molding the resulting SPS resin is excellent in long-term heat resistance than a molded article obtained by injection molding an ordinary SPS resin.

DESCRIPTION OF EMBODIMENT

As a result of the earnest investigations, the present inventors have found that the problem can be solved by the production method of an SPS resin that uses the combination of the particular compounds as a catalyst and defining the transition metal content derived from the particular metal compound in the catalyst to the particular amount. It has also found that the heat resistance, particularly the long-term heat resistance, of the injection molded article can be excellent by defining the metal content derived from the catalyst, particularly the titanium content and the aluminum content, in the SPS resin to the particular range. The present invention will be described in detail below.

In the description herein, the expression "XX to YY" means "XX or more and YY or less". In the description herein, the preferred embodiments may be arbitrarily employed, and a combination of the preferred embodiments may be further preferred.

[Method for Producing Styrene Resin Having Syndiotactic Structure]

The method for producing a styrene resin having a syndiotactic structure of the present invention includes performing addition polymerization of one or more of a vinyl aromatic monomer in the presence of a catalyst containing a half metallocene transition metal compound (A) having at least one kind selected from metals of groups 3 to 5 of the periodic table and lanthanoid transition metals as a central metal, a compound (B) represented by the general formula (1), and a compound (C) selected from at least one kind of an oxygen-containing compound (c1) and a compound (c2) capable of forming an ionic complex through reaction with a transition metal compound, and the styrene resin produced has a transition metal content derived from the half metallocene transition metal compound (A) of 1.5 to 12 ppm by mass:

$$((R^1)_3\text{-}Q\text{-}Y)_k\text{—}Z\text{—}(R^2)_{j-k} \quad (1)$$

wherein $R^1$ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j−1).

The production method of the present invention requires the use, as a catalyst, of the half metallocene transition metal compound (A) having at least one kind selected from metals of groups 3 to 5 of the periodic table and lanthanoid transition metals as a central metal, the compound (B) represented by the general formula (1), and the compound (C) selected from at least one kind of an oxygen-containing compound (c1) and a compound (c2) capable of forming an ionic complex through reaction with a transition metal compound. The catalyst is described in detail below.

<Half Metallocene Transition Metal Compound (A)>

The half metallocene transition metal compound (A) is a half metallocene transition metal compound that has at least one kind selected from metals of groups 3 to 5 of the periodic table and lanthanoid transition metals as a central metal.

The half metallocene transition metal compound (A) may have, for example, a structure represented by the general formula (2):

$R^3MU_{a-1}L_b$ (2)

wherein $R^3$ represents a π ligand; M represents at least one kind selected from metals of groups 3 to 5 of the periodic table and lanthanoid transition metals; U represents a mono-anion ligand, in which plural ligands represented by U may be the same as or different from each other, and plural ligands represented by U may be bonded to each other via an arbitrary group; L represents a Lewis base; a represents a valence number of M; and b represents 0, 1, or 2, in which in the case where L represents plural groups, the plural groups represented by L may be the same as or different from each other. In the general formula (2), $R^3$ represents a π ligand, and preferably represents a substituted or unsubstituted (which may be hereinafter referred to as (substituted)) cyclopentadienyl group, a (substituted) indenyl group, or a condensed polycyclic cyclopentadienyl group, in which at least one of the polymembered rings condensed to the cyclopentadienyl group is a saturated ring. Examples of the condensed polycyclic cyclopentadienyl group include ones selected from condensed polycyclic cyclopentadienyl groups represented by the general formulae (i) to (iii):

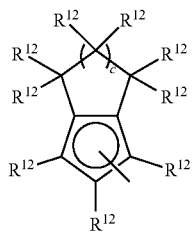

(i)

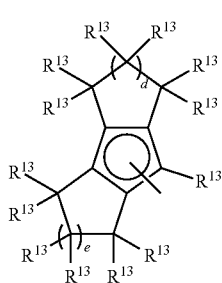

(ii)

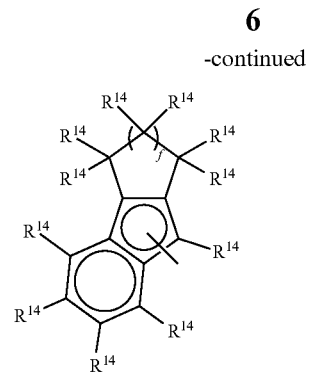

(iii)

wherein $R^{12}$, $R^{13}$, and $R^{14}$ each represent a hydrogen atom, a halogen atom, an aliphatic hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, an amino group, an amide group, a carboxy group, or an alkylsilyl group, in which groups represented by each of $R^{12}$, $R^{13}$, and $R^{14}$ may be the same as or different from each other; and c, d, e, and f each represent an integer of 1 or more.

Preferred examples among these include ones selected from condensed polycyclic cyclopentadienyl groups represented by the following general formulae (iv) to (vi):

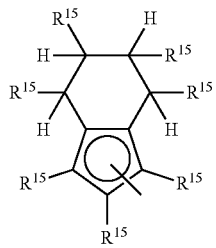

(iv)

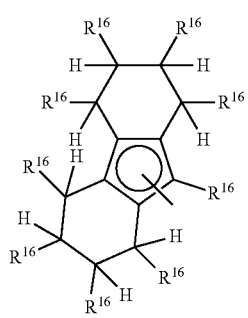

(v)

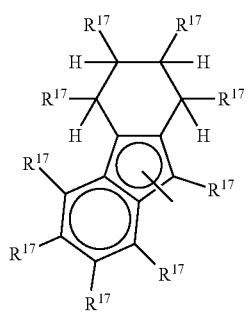

(vi)

wherein $R^{15}$, $R^{16}$, and $R^{17}$ each represent a hydrogen atom or a methyl group, in which groups represented by each of $R^{15}$, $R^{16}$, and $R^{17}$ may be the same as or different from each other.

Among these, 4,5,6,7-tetrahydroindenyl groups are preferred from the standpoint of the catalyst activity and the easiness of synthesis. Specific examples, of group represented by $R^3$ include a 4,5,6,7-tetrahydroindenyl group; a 1-methyl-4,5,6,7-tetrahydroindenyl group; a 2-methyl-4,5,6,7-tetrahydroindenyl group; a 1,2-dimethyl-4,5,6,7-tetrahydroindenyl group; a 1,3-dimethyl-4,5,6,7-tetrahydroindenyl group; a 1,2,3-trimethyl-4,5,6,7-tetrahydroindenyl group; a 1,2,3,4,5,6,7-heptamethyl-4,5,6,7-tetrahydroindenyl group; a 1,2,4,5,6,7-hexamethyl-4,5,6,7-tetrahydroindenyl group; a 1,3,4,5,6,7-hexamethyl-4,5,6,7-tetrahydroindenyl group; an octahydrofluorenyl group; a 1,2,3,4-tetrahydrofluorenyl group; a 9-methyl-1,2,3,4-tetrahydrofluorenyl group; and 9-methyl-octahydrofluorenyl group.

M represents a metal of groups 3 to 5 of the periodic table or a lanthanoid transition metal. Examples of the metal include a metal of group 3 of the periodic table, such as scandium and yttrium, a metal of group 4 of the periodic table, such as titanium, zirconium, and hafnium, a lanthanoid transition metal, and a metal of group 5 of the periodic table, such as niobium and tantalum. Metals of group 3 of the periodic table and a metal of group 4 of the periodic table are preferred, and scandium, yttrium, and titanium are preferably used, from the standpoint of the catalyst activity. Among these, titanium is more preferred from the standpoint of the handling.

U represents a monoanion ligand, and specific examples thereof include a hydrogen atom, a halogen atom, an aliphatic hydrocarbon group having 1 to 20 carbon atoms, an aromatic hydrocarbon group having 6 to 20 carbon atoms, an alkoxy group having 1 to 20 carbon atoms, an aryloxy group having 6 to 20 carbon atoms, a thioalkoxy group having 1 to 20 carbon atoms, a thioaryloxy group having 6 to 20 carbon atoms, an amino group, an amide group, a carboxy group, and an alkylsilyl group. Plural ligands represented by U may be the same as or different from each other, and may be bonded to each other via an arbitrary group. Specific examples of the ligand represented by U include a hydrogen atom, a chlorine atom, a bromine atom, an iodine atom, a methyl group, a benzyl group, a phenyl group, a trimethylsilylmethyl group, a methoxy group, an ethoxy group, a phenoxy group, a thiomethoxy group, a thiophenoxy group, a dimethylamino group, and a diisopropylamino group. L represents a Lewis base; a represents a valence number of M; and b represents 0, 1, or 2.

The half metallocene transition metal compound (A) represented by the general formula (2) used is preferably a compound having groups that are arbitrarily selected from $R^3$, M, and U exemplified above.

Examples of the half metallocene transition metal compound (A) represented by the general formula (2) include pentamethylcyclopentadienyl titanium trichloride; 1,2,3-trimethylindenyl titanium trichloride; 4,5,6,7-tetrahydroindenyl titanium trichloride; 4,5,6,7-tetrahydroindenyl titanium trimethyl; 4,5,6,7-tetrahydroindenyl titanium tribenzyl; 4,5,6,7-tetrahydroindenyl trimethoxide; 1-methyl-4,5,6,7-tetrahydroindenyl titanium trichloride; 1-methyl-4,5,6,7-tetrahydroindenyl titanium trimethyl; 1-methyl-4,5,6,7-tetrahydroindenyl titanium tribenzyl; 1-methyl-4,5,6,7-tetrahydroindenyl titanium trimethoxide; 2-methyl-4,5,6,7-tetrahydroindenyl titanium trichloride; 2-methyl-4,5,6,7-tetrahydroindenyl titanium trimethyl; 2-methyl-4,5,6,7-tetrahydroindenyl titanium tribenzyl; 2-methyl-4,5,6,7-tetrahydroindenyl titanium trimethoxide; 1,2-dimethyl-4,5,6,7-tetrahydroindenyl titanium trichloride; 1,2-dimethyl-4,5,6,7-tetrahydroindenyl titanium trimethyl; 1,2-dimethyl-4,5,6,7-tetrahydroindenyl titanium tribenzyl; 1,2-dimethyl-4,5,6,7-tetrahydroindenyl titanium trimethoxide; 1,3-dimethyl-4,5,6,7-tetrahydroindenyl titanium trichloride; 1,3-dimethyl-4,5,6,7-tetrahydroindenyl titanium trimethyl; 1,3-dimethyl-4,5,6,7-tetrahydroindenyl titanium tribenzyl; 1,3-dimethyl-4,5,6,7-tetrahydroindenyl titanium trimethoxide; 1,2,3-trimethyl-4,5,6,7-tetrahydroindenyl titanium trichloride; 1,2,3-trimethyl-4,5,6,7-tetrahydroindenyl titanium trimethyl; 1,2,3-trimethyl-4,5,6,7-tetrahydroindenyl titanium tribenzyl; 1,2,3-trimethyl-4,5,6,7-tetrahydroindenyl titanium trimethoxide; 1,2,3,4,5,6,7-heptamethyl-4,5,6,7-tetrahydroindenyl titanium trichloride; 1,2,3,4,5,6,7-heptamethyl-4,5,6,7-tetrahydroindenyl titanium trimethyl; 1,2,3,4,5,6,7-heptamethyl-4,5,6,7-tetrahydroindenyl titanium tribenzyl; 1,2,3,4,5,6,7-heptamethyl-4,5,6,7-tetrahydroindenyl titanium trimethoxide; 1,2,4,5,6,7-hexamethyl-4,5,6,7-tetrahydroindenyl titanium trichloride; 1,2,4,5,6,7-hexamethyl-4,5,6,7-tetrahydroindenyl titanium trimethyl; 1,2,4,5, 6,7-hexamethyl-4,5,6,7-tetrahydroindenyl titanium tribenzyl; 1,2,4,5,6,7-hexamethyl-4,5,6,7-tetrahydroindenyl titanium trimethoxide; 1,3,4,5,6,7-hexamethyl-4,5,6,7-tetrahydroindenyl titanium trichloride; 1,3,4,5,6,7-hexamethyl-4,5,6,7-tetrahydroindenyl titanium trimethyl; 1,3,4,5,6,7-hexamethyl-4,5,6,7-tetrahydroindenyl titanium tribenzyl; 1,3,4,5,6,7-hexamethyl-4,5,6,7-tetrahydroindenyl titanium trimethoxide; octahydrofluorenyl titanium trichloride; octahydrofluorenyl titanium trimethyl; octahydrofluorenyl titanium tribenzyl; octahydrofluorenyl titanium trimethoxide; 1,2,3,4-tetrahydrofluorenyl titanium trichloride; 1,2,3,4-tetrahydrofluorenyl titanium trimethyl; 1,2,3,4-tetrahydrofluorenyl titanium tribenzyl; 1,2,3,4-tetrahydrofluorenyl titanium trimethoxide; 9-methyl-1,2,3,4-tetrahydrofluorenyl titanium trichloride; 9-methyl-1,2,3,4-tetrahydrofluorenyl titanium trimethyl; 9-methyl-1,2,3,4-tetrahydrofluorenyl titanium tribenzyl; 9-methyl-1,2,3,4-tetrahydrofluorenyl titanium trimethoxide; 9-methyl-octahydrofluorenyl titanium trichloride; 9-methyl-octahydrofluorenyl titanium trimethyl; 9-methyl-octahydrofluorenyl titanium tribenzyl; and 9-methyl-octahydrofluorenyl titanium trimethoxide, and also include compounds obtained by replacing titanium in these compounds by zirconium or hafnium, and analogous compounds of a transition metal element of the other groups or the lanthanoid series, but are not limited thereto. A yttrium compound, a scandium compound, and a titanium compound are preferred from the standpoint of the catalyst activity. Among these, a titanium compound is preferred from the standpoint of the handling.

<Compound (B) Represented by General Formula (1)>

The general formula (1) is cited again below:

$$((R^1)_3\text{-}Q\text{-}Y)_k\text{—}Z\text{—}(R^2)_{j-k} \qquad (1)$$

wherein $R^1$ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j−1).

Among these, the following are preferably used:

(1) Q represents carbon, Y represents oxygen, and Z represents aluminum;

(2) at least one of three groups represented by $R^1$ is an aromatic hydrocarbon group having 6 to 30 carbon atoms;

(3) three groups represented by $R^1$ all are a hydrocarbon group having 1 or more carbon atoms;

(4) three groups represented by $R^1$ all are an aromatic hydrocarbon group having 6 to 30 carbon atoms, and preferably a phenyl group; or (5) $R^2$ represents an alkyl group having 2 or more carbon atoms.

In particular, the compound (B) is preferably a compound represented by the general formula (1), in which Z represents aluminum.

The compound (B) represented by the general formula (1) is not limited by the production method thereof, as far as the compound has the structure represented by the general formula, and a compound obtained through reaction of a compound (b1) represented by the general formula $(R^1)_3$—C—$OR^{33}$ and a compound (b2) represented by the general formula $Z(R^2)_j$ is preferably used.

Herein, $R^1$, Z, j, and $R^2$ have the same meanings as above. $R^{33}$ represents a hydrogen atom, a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group. $R^1$ and $R^{33}$ may be the same as or different from each other. $R^1$ and $R^{33}$ may be bonded to each other to form a ring structure depending on necessity.

Specific examples of the compound of the formula (1) include a reaction product of at least one kind (b1) selected from an alcohol compound, an ether compound, an aldehyde compound, a ketone compound, a carboxylic acid compound, and a carboxylate ester compound, and an aluminum compound (b2). More preferred examples thereof include a reaction product of an alcohol compound (b1) and an aluminum compound (b2). In this case, it is also preferred that (1) at least one of three groups represented by $R^1$ in $(R^1)_3$ is an aromatic hydrocarbon group having 6 to 30 carbon atoms; (2) three groups represented by $R^1$ in $(R^1)_3$ all are a hydrocarbon group having 1 or more carbon atoms; (3) three groups represented by $R^1$ in $(R^1)_3$ all are an aliphatic hydrocarbon group having 1 to 30 carbon atoms; (4) three groups represented by $R^1$ in $(R^1)_3$ all are an aromatic hydrocarbon group having 6 to 30 carbon atoms, and preferably a phenyl group; or (5) $R^2$ represents an alkyl group having 2 or more carbon atoms. Specific examples thereof include a compound, in which $R^1$ all represent a phenyl group, Q represents carbon, Y represents oxygen, Z represents aluminum, k=1, and $R^2$ represents an isobutyl group. In other words, a reaction product of triphenylmethanol (b1) and tributylaluminum (b2) is most preferred.

The reaction condition of the compound (b1) and the compound (b2) is not particularly limited, and the following condition may be preferably selected. The blending ratio in terms of molar ratio (compound (b1))/(compound (b2)) is preferably in a range of 1/0.01 to 1/100, more preferably 1/0.5 to 1/50, and particularly preferably 1/0.8 to 1/10. The reaction temperature is preferably −80° C. to 300° C., and more preferably −10° C. to 50° C.

The solvent used in the reaction is also not particularly limited, and a solvent used in polymerization, such as toluene and ethylbenzene, is preferably used.

The compound (b1) and the compound (b2) may be directly fed to the field of catalyst synthesis or the field of polymerization, instead of the compound (B) represented by the general formula (1). In this case, accordingly, the catalyst components are the half metallocene transition metal compound (A), the compound (b1), and the compound (b2).

<Compound (C)>

The compound (C) is selected from at least one kind of an oxygen-containing compound (c1) and a compound (c2) capable of forming an ionic complex through reaction with a transition metal compound. Among these, an oxygen-containing compound (c) is preferred.

[Oxygen-Containing Compound (c1)]

Examples of the oxygen-containing compound include a compound represented by the general formula (c11) and/or the general formula (c12).

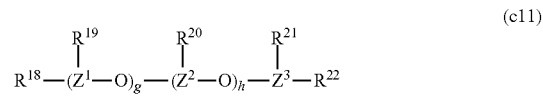

(c11)

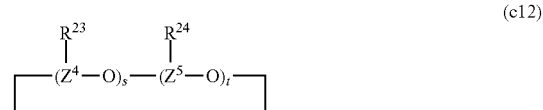

(c12)

In the general formulae (c11) and (c12), $R^{18}$ to $R^{24}$ each represent an alkyl group having 1 to 8 carbon atoms, and specific examples thereof include a methyl group, an ethyl group, a n-propyl group, an isopropyl group, various butyl groups, various pentyl groups, various hexyl groups, various heptyl groups, and various octyl groups. $R^{18}$ to $R^{22}$ may be the same as or different from each other, and $R^{23}$ and $R^{24}$ may be the same as or different from each other. $Z^1$ to $Z^5$ each represent an element of group 13 of the periodic table, and specific examples thereof include B, Al, Ga, In, and Tl, in which B and Al are preferred, and Al is more preferred. $Z^1$ to $Z^3$ may be the same as or different from each other, and $Z^4$ and $Z^5$ may be the same as or different from each other. g, h, s, and t each represent a number of 0 to 50, provided that (g+h) and (s+t) each are 1 or more. g, h, s, and t each are preferably in a range of 1 to 20, and particularly preferably a range of 1 to 5.

The oxygen-containing compound is preferably an alkylaluminoxane. Preferred specific examples thereof include methylaluminoxane, methylisobutylaluminoxane, and isobutylaluminoxane.

[Compound (c2) Capable of Forming Ionic Complex Through Reaction with Transition Metal Compound]

Examples of the compound (c2) capable of forming an ionic complex through reaction with a transition metal compound include a coordination complex compound containing an anion having plural groups bonded to a metal and a cation, and a Lewis acid. The coordination complex compound containing an anion having plural groups bonded to a metal and a cation includes various compounds, and for example, a compound represented by the following general formula (c21) or (c22) is preferably used.

(c21)

(c22)

In the formulae (c21) and (c22), $L^2$ is $M^5$, $R^{25}R^{26}M^6$, or $R^{27}{}_3C$ described later, $L^3$ represents a Lewis base, and $M^3$ and $M^4$ each represent a metal selected from groups 5 to 15 of the periodic table. $M^5$ represents a metal selected from group 1 and groups 8 to 12 of the periodic table, and $M^6$ represents a metal selected from groups 8 to 10 of the periodic table. $X^3$ each represent a hydrogen atom, a dialkylamino group, an alkoxy group, an aryloxy group, an alkyl group having 1 to 20 carbon atoms, an aryl group having 6 to 20 carbon atoms, an alkylaryl group, an arylalkyl group, a substituted alkyl group, an organic metalloid group, or a halogen atom. Plural groups or atoms represented by $X^3$ may be the same as or different from each other. $R^{25}$ and $R^{26}$ each represent a cyclopentadienyl group, a substituted cyclopentadienyl group, an indenyl group, or a fluorenyl group, and $R^{27}$ represents an alkyl group or an aryl group. v represents an integer of 1 to 7, which is a valence number of $M^3$ or $M^4$, u represents an integer of 2 to 8, i represents an integer of 1 to 7, which is an ionic valence number of $[L^2]$ or $[L^3\text{-H}]$, y represents an integer of 1 or more, and $z=y\times i/(u-v)$.

Specific examples of $M^3$ and $M^4$ include B, Al, Si, P, As, and Sb, specific examples of $M^5$ include Ag, Cu, Na, and Li, and specific examples of $M^6$ include Fe, Co, and Ni. Specific examples of $X^3$ include dialkylamino groups, such as a dimethylamino group and a diethylamino group; alkoxy groups, such as a methoxy group, an ethoxy group, and a n-butoxy group; aryloxy groups, such as a phenoxy group, a 2,6-dimethylphenoxy group, and a naphthyloxy group; alkyl groups having 1 to 20 carbon atoms, such as a methyl group, an ethyl group, a n-propyl group, an isopropyl group, a n-butyl group, a n-octyl group, and a 2-ethylhexyl group; aryl groups having 6 to 20 carbon atoms, alkylaryl groups, and arylalkyl groups, such as a phenyl group, a p-tolyl group, a benzyl group, a pentafluorophenyl group, 3,5-di(trifluoromethyl)phenyl group, a 4-tert-butylphenyl group, a 2,6-dimethylphenyl group, a 3,5-dimethylphenyl group, a 2,4-dimethylphenyl group, and a 1,2-dimethylphenyl group; halogen, such as F, Cl, Br, and I; and organic metalloid groups, such as a pentamethylantimony group, a trimethylsilyl group, a trimethylgermyl group, a diphenylarsine group, a dicyclohexylantimony group, and a diphenylboron group. Specific examples of the substituted cyclopentadienyl group represented by $R^{25}$ and $R^{26}$ include a methylcyclopentadienyl group, a butylcyclopentadienyl group, and a pentamethylcyclopentadienyl group.

In the present invention, specific examples of the anion having plural groups bonded to a metal include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B[C_6(CF_3)F_4]_4^-$, $B(C_6H_5)_4^-$, $PF_6^-$, $P(C_6F_5)_6^-$, and $Al(C_6HF_4)_4^-$. Examples of the metal cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$, and $Li^+$. In the above formulae, Cp represents a cyclopentadienyl group, Me represents a methyl group, and Bu represents a butyl group. Examples of the cation also include nitrogen-containing compounds, such as pyridinium, 2,4-dinitro-N,N-diethylanilinium, diphenylammonium, p-nitroanilinium, 2,5-dichloroanilinium, p-nitro-N,N-dimethylanilinium, quinolinium, N,N-dimethylanilinium, and N,N-diethylanilinium; a carbenium compound, such as triphenylcarbenium, tri(4-methylphenyl)carbenium, and tri(4-methoxyphenyl)carbenium; alkylphosphonium ions, such as $CH_3PH_3^+$, $C_2H_5PH_3^+$, $C_3H_7PH_3^+$, $(CH_3)_2PH_2^+$, $(C_2H_5)_2PH_2^+$, $(C_3H_7)_2PH_2^+$, $(CH_3)_3PH^+$, $(C_2H_5)_3PH^+$, $(C_3H_7)_3PH^+$, $(CF_3)_3PH^+$, $(CH_3)_4P^+$, $(C_2H_5)_4P^+$, and $(C_3H_7)_4P^+$; and arylphosphonium ions, such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$, and $(C_2H_5)_2(C_6H_5)_2P^+$.

Among the compound of the general formulae (c21) and (c22), the following compounds are particularly preferably used.

Examples of the compound of the general formula (c21) include ferrocenium tetraphenylborate, dimethylferrocenium tetrakis(pentafluorophenyl)borate, ferrocenium tetrakis(pentafluorophenyl)borate, decamethylferrocenium tetrakis(pentafluorophenyl)borate, acetylferrocenium tetrakis(pentafluorophenyl)borate, formylferrocenium tetrakis(pentafluorophenyl)borate, cyanoferrocenium tetrakis(pentafluorophenyl)borate, silver tetraphenylborate, silver tetrakis(pentafluorophenyl)borate, trityl tetraphenylborate, trityl tetrakis(pentafluorophenyl)borate, silver hexafluoroarsenate, silver hexafluoroantimonate, and silver tetrafluoroborate.

Examples of the compound of the general formula (c22) include triethylammonium tetraphenylborate, tri(n-butyl)ammonium tetraphenylborate, trimethylammonium tetraphenylborate, triethylammonium tetrakis(pentafluorophenyl)borate, tri(n-butyl)ammonium tetrakis(pentafluorophenyl)borate, triethylammonium hexafluoroarsenate, pyridinium tetrakis(pentafluorophenyl)borate, pyrrolinium tetrakis(pentafluorophenyl)borate, N,N-dimethylanilinium tetrakis(pentafluorophenyl)borate, and methyldiphenylammonium tetrakis(pentafluorophenyl)borate.

Examples of the Lewis acid used include $B(C_6F_5)_3$, $B(C_6HF_4)_3$, $B(C_6H_2F_3)_3$, $B(C_6H_3F_2)_3$, $B(C_6H_4F)_3$, $B(C_6H_5)_3$, $BF_3$, $B[C_6(CF_3)F_4]_3$, $PF_5$, $P(C_6F_5)_5$, and $Al(C_6HF_4)_3$.

The production method of the SPS resin uses a metal catalyst, and therefore the metal derived from the catalyst in the production, such as aluminum and titanium, remains in the SPS resin. In the case where a large amount of the catalyst is required for achieving the sufficient catalyst activity, the increase in cost and the residual metal described above present a problem.

The production of a styrene resin is classified into a "batch method" and a "continuous method". The "batch method" can suppress the amount of the catalyst used as compared to the "continuous method", but the amount of the styrene resin obtained in one lot of production is small, which is inferior in economic efficiency from the standpoint of the energy and the like. The "continuous method" can provide a large amount of the styrene resin with a high energy efficiency, but requires a certain amount of the catalyst as compared to the "batch method".

As a result of the earnest investigations by the present inventors, it has been found that in the case where the combination of the particular metal compounds is used as a catalyst, the catalyst activity can be enhanced, and simultaneously a styrene resin can be produced that has a transition metal content derived from the half metallocene transition metal compound (A) suppressed to 1.5 to 12 ppm by mass. Furthermore, the present inventors have found that with the transition metal content within the range, an injection molded article having excellent long-term heat resistance than an injection molded article of an ordinary SPS resin can be obtained. According to the present invention, the styrene resin can be produced by the continuous method while suppressing the residual metal amount to the aforementioned range, and the styrene resin can be obtained commercially advantageously.

Specifically, the central metal of the half metallocene transition metal compound (A) is preferably titanium from the standpoint of the handling as described above, and therefore the production method of the present invention can produce the styrene resin that has titanium as the transition metal derived from the half metallocene transition metal compound (A) in the resulting styrene resin, and has a residual titanium content suppressed to 1.5 to 12 ppm by mass. The production method of the present invention can produce more preferably the styrene resin that further has a metal content derived from the compound (B), such as the aluminum content, suppressed to 70 to 800 ppm by mass.

The present inventors have found that the styrene resin obtained by the production method of the present invention that has a transition metal content derived from the half metallocene transition metal compound (A), such as a titanium content, suppressed to 1.5 to 12 ppm by mass is optimum for an injection molded article demanded to have long-term heat resistance. Furthermore, in a preferred aspect of the production method of the present invention, the styrene resin that has a metal content derived from the compound (B), such as the aluminum content, suppressed to 70 to 800 ppm by mass can be obtained, and an injection molded article further excellent in long-term heat resistance can be obtained within the range.

The "long-term heat resistance" referred in the present invention means the extent of heat resistance demanded according to JIS K7226:1998. Specifically, the breakage time where the tensile strength becomes 50% of the initial strength is obtained at each exposure temperature within a range of 150 to 180° C. The temperature index (TI) is obtained from the Arrhenius plot, in which the breakage time is plotted against the inverse of the exposure temperature.

The styrene resin obtained by the production method of the present invention preferably contains the transition metal content derived from the half metallocene transition metal compound (A) in an amount of 11 ppm by mass or less, more preferably 10 ppm by mass or less, and further preferably 8 ppm by mass or less. Specific examples of the transition metal derived from the half metallocene transition metal compound (A) include titanium as described above.

The styrene resin obtained by the production method of the present invention preferably contains the metal content derived from the compound (B) in an amount of less than 800 ppm by mass, more preferably 700 ppm by mass or less, and further preferably 500 ppm by mass or less. Examples of the metal derived from the general formula (1) include aluminum as described above.

The styrene resin obtained by the production method of the present invention more preferably contains the transition metal content derived from the half metallocene transition metal compound (A) in an amount of 2.5 ppm by mass or more and the metal content derived from the compound (B) represented by the general formula (1) in an amount of 115 ppm by mass or more from the standpoint of the further enhancement of the production efficiency of the production method of the present invention and the achievement of the excellent long-term heat resistance of the injection molded article.

The styrene resin obtained by the batch method generally has a residual aluminum content of approximately 16 ppm by mass and a residual titanium content of approximately 0.025 ppm by mass, which are smaller than the continuous method, while these values fluctuate depending on the production amount and the properties of the resulting styrene resin. However, the efficient production as in the continuous method is difficult to perform.

In the production method of the present invention, the compound (D) and/or the compound (E) below may also be used as a catalyst, in addition to the compound (A), the compound (B), and the compound (C) described above.

<Compound (D)>

The compound (D) is a compound represented by the following general formula (3):

$$R^4_p Al(OR^5)_q X^1_{2-p-q} H \qquad (3)$$

wherein $R^4$ and $R^5$ each represent an alkyl group having 1 to 8 carbon atoms; $X^1$ represents a halogen atom; and p and q satisfy $0<p\leq2$, $0\leq q<2$, and $p+q\leq2$.

The compound (D) represented by the general formula (3) is preferably a dialkylaluminum hydride compound and a monoalkylaluminum hydride compound.

Specific examples thereof include dialkylaluminum hydrides, such as dimethylaluminum hydride, diethylaluminum hydride, di-n-propylaluminum hydride, diisopropylaluminum hydride, di-n-butylaluminum hydride, and diisobutylaluminum hydride; alkylaluminum halohydrides, such as methylaluminum chlorohydride, ethylaluminum chlorohydride, n-propylaluminum chlorohydride, isopropylaluminum chlorohydride, n-butylaluminum chlorohydride, and isobutylaluminum chlorohydride; and alkylaluminum alkoxyhydrides, such as ethylaluminum methoxyhydride and ethylaluminum ethoxyhydride. Among these, diisobutylaluminum hydride is preferred from the standpoint of the catalyst activity.

<Compound (E)>

The compound (E) is a compound represented by the following general formula (4):

$$R^6_m Al(OR^7)_n X^2_{3-m-n} \qquad (4)$$

wherein $R^6$ and $R^7$ each represent an alkyl group having 1 to 8 carbon atoms; $X^2$ represents a halogen atom; and m and n satisfy $0<m\leq3$, $0\leq n<3$, and $m+n\leq3$.

The compound (E) represented by the general formula (4) is preferably a trialkylaluminum and a dialkylaluminum compound from the standpoint of the catalyst activity.

Specific examples thereof include trialkylaluminum, such as trimethylaluminum, triethylaluminum, tri-n-propylaluminum, triisopropylaluminum, tri-n-butylaluminum, and triisobutylaluminum; dialkylaluminum halides, such as dimethylaluminum chloride, diethylaluminum chloride, di-n-propylaluminum chloride, diisopropylaluminum chloride, di-n-butylaluminum chloride, and diisobutylaluminum chloride; and dialkylaluminum alkoxides, such as diethylaluminum methoxide and diethylaluminum ethoxide, and among these, triisobutylaluminum is preferred.

In the production method of the present invention, as described above, the half metallocene transition metal compound (A), the compound (B) represented by the general formula (1), and the compound (C), and depending on necessity the compound (D) and/or the compound (E) may be used in combination as the catalyst. The preparation method of the catalyst used is not particularly limited, and the catalyst may be prepared in the following order.

(1) Contact Sequence of Components (i) In the case where the half metallocene transition metal compound (A), the compound (B), and the compound (C) are used, examples of the method include a method of contacting the half metallocene transition metal compound (A) and the compound (C) with each other, and then contacting the compound (B) therewith, a method of contacting the half metallocene transition metal compound (A) and the compound (B) with each other, and then contacting the compound (C) therewith, a method of contacting the compound (B) and the compound (C) with each other, and then contacting the half metallocene transition metal compound (A) therewith, and a method of contacting the three components with each other simultaneously.

(ii) In the case where the combination of the compound (D) and/or the compound (E) is used in addition to the three components, the contact sequence of the compound (D) and/or the compound (E) is not particularly limited. Specifically, the compound (D) and/or the compound (E) may be used after contacting with the half metallocene transition metal compound (A), the compound (D) and/or the compound (E) may be used after contacting with the compound (B), and the compound (D) and/or the compound (E) may be used after contacting with the compound (C). In alternative, a method of contacting the half metallocene transition metal compound (A), the compound (C), and the compound (D) and/or the compound (E) with each other in advance, and then contacting the compound (B) component therewith may be used.

(iii) In the case where the compound (b1) and the compound (b2) are used as the compound (B), the contact sequence of the components is not particularly limited as similar to the aforementioned items (i) and (ii), and it is preferred that the component (b1) and the component (b2) are contacted with each other in advance before contacting the other components.

(2) Proportions of Components (i) Case using Half Metallocene Transition Metal Compound (A), Compound (B), and Compound (C)

In the case where the compound (B) is the aluminum compound, the compound (B) may be selected in a range of 0.5 to 1,000, and preferably 1 to 100, in terms of molar ratio of aluminum atom, per 1 mol of the half metallocene transition metal compound (A) component.

In the case where the oxygen-containing compound is used as the compound (C), and the compound (C) is an organoaluminum compound, the molar ratio of the half metallocene transition metal compound (A) and the compound (C) may be selected in a range of 1 to 10,000, and preferably 10 to 1,000, in terms of molar ratio of aluminum atom, per 1 mol of the compound (A). In the case where the compound capable of forming an ionic complex through reaction with a transition metal compound is used as the compound (C) component, and the compound (C) is the boron compound, the molar ratio may be selected in a range of 0.5 to 10, and preferably 0.8 to 5, in terms of molar ratio of boron atom, per 1 mol of the compound (A).

(ii) In the case where the compound (b1) and the compound (b2) are used as the compound (B), the molar ratio (compound (b1))/(compound (b2)) is preferably in a range of 1/0.01 to 1/100, more preferably 1/0.5 to 1/50, and particularly preferably 1/0.8 to 1/10. In the case where the component (b2) is the aluminum compound, the component (b2) is preferably selected in a range of 0.5 to 10,000, more preferably 0.5 to 1,000, and most preferably 1 to 1,000, in terms of molar ratio of aluminum atom, per 1 mol of the half metallocene transition metal compound (A).

(iii) Case Using Compound (D) and/or Compound (E) in Addition to Three Components In the case where the compound (D) and/or the compound (E) is the aluminum compound, the blending amount of the compound (D) and/or the compound (E) may be selected in a range of 0.5 to 1,000, and preferably 1 to 100, in terms of molar ratio of aluminum atom, per 1 mol of the half metallocene transition metal compound (A).

(3) Contact Condition of Components

The catalyst components may be contacted in an inert atmosphere, such as nitrogen, at the polymerization temperature or lower. For example, a temperature in a range of −30 to 200° C. may be used.

The process of the practical production of the styrene polymer using the catalyst is described in detail. In the method for producing the styrene polymer of the present invention, homopolymerization of a styrene compound and copolymerization of a styrene compound and another styrene compound (i.e., copolymerization of different styrene compounds) can be favorably performed by using the polymerization catalyst described above.

<Monomer>

The styrene compound is not particularly limited, and examples thereof include styrene; alkylstyrene compounds, such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, 2,4-dimethylstyrene, 2,5-dimethylstyrene, and 3,5-dimethylstyrene; alkoxystyrene compounds, such as p-methoxystyrene, o-methoxystyrene, and m-methoxystyrene; and halostyrenes, such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene, and also include mesitylstyrene, trimethylsilylstyrene, a vinylbenzoate ester, and divinylbenzene.

Among these, styrene, an alkylstyrene compound, and divinylbenzene are preferred, and styrene, p-methylstyrene, and divinylbenzene are more preferred.

In the present invention, the styrene compounds may be used alone or as an arbitrary combination of two or more kinds thereof.

<Polymerization Condition>

1. Preliminary Polymerization

In the method for producing the styrene polymer of the present invention, preliminary polymerization may be performed by using the polymerization catalyst described above. The preliminary polymerization may be performed by contacting, for example, a small amount of a styrene compound with the catalyst, and the method therefor is not particularly limited and may be performed by a known method.

The styrene compound used in the preliminary polymerization is not particularly limited, and aforementioned compounds may be used. The preliminary polymerization temperature is generally −20 to 200° C., and preferably −1° C. to 130° C. In the preliminary polymerization, the solvent used may be an inert hydrocarbon, an aliphatic hydrocarbon, an aromatic hydrocarbon, a monomer, and the like.

2. Main Polymerization

The polymerization method in the main polymerization is not particularly limited, and a continuous polymerization method may be used and performed by an arbitrary method, such as a slurry polymerization method, a powder bed polymerization method, a solution polymerization method, a gas phase polymerization method, a bulk polymerization method, and a suspension polymerization method. Among these, powder bed continuous polymerization is preferably performed from the standpoint of the industrial scale production.

The contact sequence of the components of the catalyst and the monomer is not particularly limited. Specifically, a method of preparing the catalyst by mixing the components of the catalyst as described above in advance, and then feeding the monomer thereto may be employed. In alternative, a method of feeding the components of the catalyst and the monomer to the polymerization field in an arbitrary sequence may also be employed, instead of the preparation of the catalyst by mixing the components of the catalyst in advance.

A preferred embodiment is a method, in which the components other than the compound (B) or the compound (b1) and the compound (b2), i.e., the component (A), the component (C), the component (D), and the component (E) are mixed in advance, and separately, the monomer is mixed with the compound (B) component, or the monomer is mixed with the compound (b1) and the compound (b2), and then both of them are mixed immediately before the polymerization, so as to perform the polymerization.

In the present invention, it is more preferred that the polymerization of the styrene monomer is performed in the presence of the catalyst by using a powder bed continuous polymerization apparatus. Herein, hydrogen may be added to the polymerization field for the enhancement of the catalyst activity. Hydrogen may be added to the reaction system in an amount of 0 to 20-fold, preferably 0 to 15-fold, more preferably 0 to 10-fold, and further preferably 0.1 to 10-fold, in terms of molar ratio, based on the center metal of the half metallocene transition metal compound (A). Hydrogen fed to the reaction system in the polymerization can enhance the activity of the polymerization catalyst and can suppress the amount thereof used. Accordingly, the residual metal amount in the styrene resin produced, such as the residual aluminum content and the residual titanium content therein, can be lowered to a range that is preferred from the standpoint of the long-term heat resistance in the case where an injection molded article is produced therewith.

However, the amount of hydrogen added that exceeds 20-fold based on the center metal of the half metallocene transition metal compound (A) is not preferred since the reflow heat resistance may be deteriorated.

In the method for producing the styrene resin of the present invention, the residual metal content in the resulting styrene resin is low due to the high catalyst activity achieved by the combination of the catalysts and/or the addition of hydrogen. Accordingly, it is not necessary to perform a decalcification treatment separately, which is advantageous in energy and is suitable for mass production.

In the case where a solvent is used in the polymerization, examples of the solvent include hydrocarbon compounds and halogenated hydrocarbon compounds, such as benzene, toluene, ethylbenzene, n-hexane, n-heptane, cyclohexane, methylene chloride, chloroform, 1,2-dichloroethane, and chlorobenzene. These compounds may be used alone or as a combination of two or more kinds thereof. While depending on the kind thereof, the monomer itself may be used as the polymerization solvent.

The amount of the catalyst used in the polymerization reaction may be generally selected in a range of 0.1 to 500 micromol, and preferably 0.5 to 100 micromol, in terms of the half metallocene transition metal compound (A), per 1 mol of the monomer, which is advantageous from the standpoint of the polymerization activity and the reactor efficiency.

The pressure in the polymerization may be generally selected in a range of ordinary pressure to 196 MPa in terms of gauge pressure. The reaction temperature is generally in a range of −50 to 150° C.

Examples of the method of controlling the molecular weight of the polymer include the selection of the kinds and the amounts of the catalyst components, and the polymerization temperature, and the introduction of hydrogen.

The styrene resin obtained by the production method of the present invention is an SPS resin having a highly syndiotactic structure. In the description herein, the term "syndiotactic" means a high proportion of the phenyl rings of the styrene units adjacent to each other that are alternately arranged with respect to the plane constituted by the main chain of the polymer block (which may be hereinafter referred to as syndiotacticity).

The tacticity can be quantitatively identified by the nuclear magnetic resonance method using isotope carbon (i.e., the $^{13}$C-NMR method). The existing proportions of continuous plural constitutional units, for example, continuous two monomer units as a diad, continuous three monomer units as a triad, and continuous five monomer units as a pentad, can be quantitatively identified by the $^{13}$C-NMR method.

In the present invention, the "styrene resin having a highly syndiotactic structure" means a polystyrene, a poly(hydrocarbon-substituted styrene), a poly(halostyrene), a poly(haloalkylstyrene), a poly(alkoxystyrene), a poly(vinyl benzoate ester), a hydrogenated polymer or a mixture thereof, and a copolymer having these as a major component, each having a racemic diad (r) fraction of generally 75% by mol or more, and preferably 85% by mol or more, or having a racemic pentad (rrrr) fraction of generally 30% by mol or more, and preferably 50% by mol or more.

Examples of the poly(hydrocarbon-substituted styrene) include poly(methylstyrene), poly(ethylstyrene), poly(isopropylstyrene), poly(tert-butylstyrene), poly(phenyl)styrene, poly(vinylnaphthalene), and poly(vinylstyrene). Examples of the poly(halostyrene) include poly(chlorostyrene), poly(bromostyrene), and poly(fluorostyrene), and examples of the poly(haloalkylstyrene) include poly(chloromethylstyrene). Examples of the poly(alkoxystyrene) include poly(methoxystyrene) and poly(ethoxystyrene).

Examples of the comonomer component of the copolymer containing these constitutional units include the monomers of the aforementioned styrene polymers, and also include olefin monomers, such as ethylene, propylene, butene, hexene, and octene; diene monomers, such as butadiene and isoprene; cyclic olefin monomers; cyclic diene monomers; and polar vinyl monomers, such as methyl methacrylate, maleic anhydride, and acrylonitrile.

Particularly preferred examples of the aforementioned styrene polymers include polystyrene, poly(p-methylstyrene), poly(m-methylstyrene), poly(p-tert-butylstyrene), poly(p-chlorostyrene), poly(m-chlorostyrene), and poly(p-fluorostyrene).

Examples thereof also include a copolymer of styrene and p-methylstyrene, a copolymer of styrene and p-tert-butylstyrene, and a copolymer of styrene and divinylbenzene.

The SPS resin obtained by the production method of the present invention preferably has a weight average molecular weight of $1\times10^4$ or more and $1\times10^6$ or less, and more preferably 50,000 or more and 500,000 or less, from the standpoint of the flowability of the resin in molding and the strength of the resulting molded article. In the case where the weight average molecular weight is $1\times10^4$ or more, a molded article having a sufficient strength can be obtained. In the case where the weight average molecular weight is $1\times10^6$ or less, there may be no problem in the flowability of the resin in molding.

In the description herein, the weight average molecular weight is a value that is obtained by measuring by the gel permeation chromatography method using a GPC apparatus (HLC-8321 GPC/HT), produced by Tosoh Corporation, a GPC column (GMHHR-H(S)HT), produced by Tosoh Corporation, and 1,2,4-trichlorobenzene as an eluent, at 145° C., and converting with the standard polystyrene calibration curve. The weight average molecular weight may be hereinafter abbreviated as a "molecular weight".

<Molded Article>

In the present invention, a molded article can be obtained by injection molding the styrene resin obtained by the production method described above. The molded article obtained by injection molding the styrene resin of the present invention can have the following characteristics based on the properties of the styrene resin obtained by the production method of the present invention.

The injection molded article of the SPS resin of the present invention may contain a metal content derived from the compound used as the catalyst as described above. Specifically, the injection molded article of the SPS resin of the present invention may contain 1.5 to 12 ppm by mass of titanium as the transition metal content derived from the half metallocene transition metal compound (A). The upper limit of the titanium content is preferably 11 ppm by mass or less, more preferably 10 ppm by mass or less, and further preferably 8 ppm by mass or less.

The injection molded article of the SPS resin of the present invention may contain aluminum as the metal derived from the compound (B). Specifically, the injection molded article of the SPS resin of the present invention may contain 70 to 800 ppm by mass or less of the aluminum content. The aluminum content may be less than 800 ppm by mass, more preferably 700 ppm by mass or less, and further preferably 500 ppm by mass or less.

The injection molded article of the SPS resin of the present invention is excellent in long-term heat resistance due to the suppressed metal content derived from the catalyst.

The injection molded article of the SPS resin of the present invention may contain triphenylmethane. Triphenylmethane is a component that is derived from the compound used as the catalyst in the production method described above. The triphenylmethane amount in the styrene resin of the present invention is preferably 10 ppm by mass or more, more preferably 20 ppm by mass or more, further preferably 30 ppm by mass or more, and particularly preferably 40 ppm by mass or more. The upper limit of the triphenylmethane amount is preferably 250 ppm by mass or less.

In the case where the triphenylmethane amount in the styrene resin of the present invention is 10 ppm by mass or more, the styrene resin having a syndiotactic structure with a high tacticity can be obtained with a sufficient catalyst amount.

An injection molded article containing the SPS resin obtained by the production method of the present invention may be provided by adding a thermoplastic resin, a rubbery elastic material, an antioxidant, an inorganic filler, a crosslinking agent, a crosslinking assistant, a nucleating agent, a plasticizer, a compatibilizing agent, a colorant, an antistatic agent, and/or the like, which are ordinarily used, to the SPS resin in such a range that does not impair the object of the present invention.

Examples of the thermoplastic resin include styrene polymers such as polystyrene having an atactic structure, polystyrene having an isotactic structure, an AS resin, and an ABS resin, and also include condensed polymers, such as polyester, e.g., polyethylene terephthalate, polycarbonate, polyphenylene oxide, polysulfone, polyethers, such as polyether sulfone, polyamide, polyphenylene sulfide (PPS), and polyoxymethylene, acrylic polymers, such as polyacrylic acid, polyacrylate ester, and polymethyl methacrylate, polyolefins, such as polyethylene, polypropylene, polybutene, poly-4-methylpentene-1, and an ethylene-propylene copolymer, halogen-containing vinyl compound polymers, such as polyvinyl chloride, polyvinylidene chloride, and polyvinylidene fluoride, and mixtures thereof.

Various materials may be used as the rubbery elastic material. Examples thereof include natural rubber, polybutadiene, polyisoprene, polyisobutylene, neoprene, polysulfide rubber, Thiokol rubber, acrylic rubber, urethane rubber, silicone rubber, epichlorohydrin rubber, a styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a styrene-butadiene random copolymer, a hydrogenated styrene-butadiene random copolymer, a styrene-ethylene-propylene random copolymer, a styrene-ethylene-butylene random copolymer, ethylene-propylene rubber (EPR), ethylene-propylene-diene rubber (EPDM), core-shell type particulate elastic materials, such as acrylonitrile-butadiene-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR), siloxane-containing core-shell rubbers, e.g., methyl methacrylate-butyl acrylate-siloxane, and rubber obtained by modifying these materials.

Among these, SBR, SBS, SEB, SEBS, SIR, SEP, SIS, SEPS, core-shell rubber, rubber obtained by modifying these materials, and the like are preferably used.

Examples of the modified rubbery elastic material include materials obtained by modifying, for example, styrene-butyl acrylate copolymer rubber, a styrene-butadiene block copolymer (SBR), a hydrogenated styrene-butadiene block copolymer (SEB), a styrene-butadiene-styrene block copolymer (SBS), a hydrogenated styrene-butadiene-styrene block copolymer (SEBS), a styrene-isoprene block copolymer (SIR), a hydrogenated styrene-isoprene block copolymer (SEP), a styrene-isoprene-styrene block copolymer (SIS), a hydrogenated styrene-isoprene-styrene block copolymer (SEPS), a styrene-butadiene random copolymer, a hydrogenated styrene-butadiene random copolymer, a styrene-ethylene-propylene random copolymer, a styrene-ethylene-butylene random copolymer, ethylene-propylene rubber (EPR), ethylene-propylene-diene rubber (EPDM), and the like, with a modifier having a polar group.

Among these, rubber obtained by modifying SEB, SEBS, SEP, SEPS, EPR, or EPDM is preferably used. Specific examples thereof include maleic anhydride-modified SEBS, maleic anhydride-modified SEPS, maleic anhydride-modified EPR, maleic anhydride-modified EPDM, epoxy-modified SEBS, and epoxy-modified SEPS. The rubbery elastic materials may be used alone or as a combination of two or more kinds thereof.

In the case where the thermoplastic resin and/or the (modified) rubbery elastic material are added to the SPS resin obtained by the production method of the present invention, the thermoplastic resin and/or the (modified) rubbery elastic material are preferably added in such a range that assuming that the total amount of the SPS resin, and the thermoplastic resin and/or the (modified) rubbery elastic material is 100% by mass, the amount of the SPS resin is preferably 80% by mass or more, more preferably 85% by mass or more, further preferably 90% by mass or more, and still further preferably 95% by mass or more.

The antioxidant may be various materials, and is particularly preferably a phosphorus antioxidant, such as a monophosphite and a diphosphite, e.g., tris(2,4-di-tert-butylphenyl) phosphite and tris(mono- and dinonylphenyl) phosphite, and a phenol-based antioxidant.

The diphosphite used is preferably a phosphorus compound represented by the following general formula is preferred:

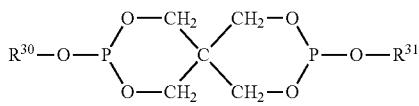

wherein $R^{30}$ and $R^{31}$ each independently represent an alkyl group having 1 to 20 carbon atoms, a cycloalkyl group having 3 to 20 carbon atoms, or an aryl group having 6 to 20 carbon atoms.

Specific examples of the phosphorus compound represented by the general formula include distearylpentaerythritol diphosphite; dioctylpentaerythritol diphosphite; diphenylpentaerythrytol diphosphite; bis(2,4-di-tert-butylphenyl) pentaerythritol diphosphite; bis(2,6-di-tert-butyl-4-methylphenyl)pentaerythritol diphosphite; and dicyclohexylpentaerythritol diphosphite.

The known materials may be used as the phenol-based antioxidant, and specific examples thereof include 2,6-di-tert-butyl-4-methylphenol; 2,6-diphenyl-4-methoxyphenol; 2,2'-methylenebis(6-tert-butyl-4-methylphenol); 2,2'-methylenebis(6-tert-butyl-4-methylphenol); 2,2'-methylenebis[4-methyl-6-(α-methylcyclohexyl)phenol]; 1,1-bis(5-tert-butyl-4-hydroxy-2-methylphenyl)butane; 2,2'-methylenebis(4-methyl-6-cyclohexylphenol); 2,2'-methylenebis(4-methyl-6-nonylphenol); 1,1,3-tris(5-tert-butyl-4-hydroxy-2-methylphenyl)butane; 2,2-bis(5-tert-butyl-4-hydroxy-2-methylphenyl)-4-n-dodecylmercaptobutane; ethylene glycol bis[3,3-bis(3-tert-butyl-4-hydroxyphenyl) butyrate]; 1,1-bis (3,5-dimethyl-2-hydroxyphenyl)-3-(n-dodecylthio)butane; 4,4'-thiobis(6-tert-butyl-3-methylphenol); 1,3,5-tris(3,5-di-tert-butyl-4-hydroxybenzyl)-2,4,6-trimethylbenzene; dioctadecyl 2,2-bis(3,5-di-tert-butyl-4-hydroxybenzyl)malonate ester; n-octadecyl-3-(4-hydroxy-3,5-di-tert-butylphenyl) propionate; tetrakis[methylene (3,5-di-tert-butyl-4-hydroxyhydrocinnamate)]methane; and pentaerythritol tetrakis(3-(3, 5-di-tert-butyl-4-hydroxyphenyl)propionate. Various materials may be used as the sulfur antioxidant, and examples thereof include 2,2-bis[[3-(dodecylthio)-1-oxopropyloxy]methyl]-1,3-propanediyl bis[3-(dodecylthio)propionate].

In addition to the phosphorus antioxidant and the phenol-based antioxidant, the amine antioxidant, the sulfur antioxidant, and the like may be used alone or as a mixture thereof. In particular, the injection molded article of the present invention preferably contains at least one kind selected from the phosphorus antioxidant, the phenol-based antioxidant, the amine antioxidant, and the sulfur antioxidant, as an antioxidant, and more preferably contains three kinds of antioxidants, i.e., the phosphorus antioxidant, the phenol-based antioxidant, and the sulfur antioxidant, in combination.

The amount of the antioxidant is generally 0.005 to 5 parts by mass per 100 parts by mass of the SPS. The blending ratio of the antioxidant that is less than 0.005 part by mass is not preferred since the molecular weight is significantly decreased, and the blending ratio thereof that exceeds 5 parts by mass is not preferred since the antioxidant bleeds or adversely affects the mechanical strength, the appearance, and the like. In the case where plural kinds of antioxidants are contained as an antioxidant in the composition, the total amount thereof is preferably controlled to the aforementioned range. The blending amount of the antioxidant is more preferably 0.01 to 4 parts by mass, and further preferably 0.02 to 3 parts by mass, per 100 parts by mass of the SPS.

The inorganic filler may be in a fiber form, a particulate form, or a powder form.

Examples of the fibrous inorganic filler include glass fibers, carbon fibers, and alumina fibers. Examples of the particulate or powder inorganic filler include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

Examples of the compatibilizing agent include a polymer that has compatibility or affinity to the SPS, and the thermoplastic resin and the rubbery elastic material, and has a polar group. Specific examples thereof include acid anhydride-modified rubbers, such as a maleic anhydride-modified SEBS, a maleic anhydride-modified SEPS, a maleic anhydride-modified SEB, a maleic anhydride-modified SEP, a maleic anhydride-modified EPR, a styrene-maleic anhydride copolymer (SMA), a styrene-glycidyl methacrylate copolymer, a terminal carboxylic acid-modified polystyrene, a terminal epoxy-modified polystyrene, a terminal oxazoline-modified polystyrene, a terminal amine-modified polystyrene, a sulfonated polystyrene, a styrene ionomer, a styrene-methyl methacrylate graft polymer, a (styrene-glycidyl methacrylate)-methyl methacrylate graft polymer, an acid-modified acrylic-styrene graft polymer, a (styrene-glycidyl methacrylate)-styrene graft polymer, a polybutylene terephthalate-polystyrene graft polymer, modified styrene polymers, such as a maleic anhydride-modified syndiotactic polystyrene, a fumaric acid-modified syndiotactic polystyrene, a glycidyl methacrylate-modified syndiotactic polystyrene, and an amine-modified syndiotactic polystyrene, and a modified polyphenylene ether polymers, such as a (styrene-maleic anhydride)-polyphenylene ether graft polymer, a maleic anhydride-modified polyphenylene ether (PPE), a fumaric acid-modified polyphenylene ether, a glycidyl methacrylate-modified polyphenylene ether, and an amine-modified polyphenylene ether. The compatibilizing agent may be used alone or as a combination of two or more kinds thereof. The addition amount of the compatibilizing agent is not particularly limited, and is preferably 0.5 to 10 parts by mass, and more preferably 1 to 5 parts by mass, per 100 parts by weight of the SPS resin.

As the nucleating agent, known ones may be arbitrarily selected and used, for example, metal salts of carboxylic acid, such as aluminum di(p-tert-butylbenzoate), metal salts of phosphoric acid, such as sodium methylenebis(2,4-di-tert-butylphenol)acid phosphate, talc, and a phthalocyanine derivative. Specific examples of the trade names thereof include Adeka Stab NA-10, Adeka Stab NA-11, Adeka Stab NA-21, Adeka Stab NA-30, and Adeka Stab NA-35, produced by Adeka Corporation, and PTBBA-AL, produced by Dainippon Ink And Chemicals, Inc. The nucleating agent may be used alone or as a combination of two or more kinds thereof. The blending amount of the nucleating agent is not particularly limited, and is preferably 0.01 to 5 parts by mass, and more preferably 0.04 to 2 parts by mass, per 100 parts by mass of the SPS resin.

As the release agent, known ones may be arbitrarily selected and used, for example, polyethylene wax, a silicone oil, a long-chain carboxylic acid, a long-chain carboxylic acid metal salt, and the like. These release agents may be used alone or as a combination of two or more kinds thereof. The blending amount of the release agent is not particularly limited, and is preferably 0.1 to 3 parts by mass, and more preferably 0.2 to 1 part by mass, per 100 parts by mass of the SPS resin.

In the production method of the styrene resin molded article of the present invention, an arbitrary one of the injection molding method may be applied.

For example, a composition containing the SPS resin and depending on necessity the aforementioned various components added thereto is prepared. The composition can be molded by injection molding with a mold having a prescribed shape.

The styrene resin molded article of the present invention has excellent long-term heat resistance as described above, and therefore can be preferably applied to purposes requiring that property, such as an automobile sensor, a housing, a connector, a magnetic valve of exhaust brake for a large automobile, a component of an LED display emitting heat, an automobile illumination, a signal lamp, an emergency lamp, a terminal block, a fuse component, and a high voltage component.

EXAMPLES

The present invention will be described in more detail with reference to examples below, but the present invention is not limited thereto.

(1) Measurement Method of Residual Aluminum Content and Residual Titanium Content The residual aluminum content and the residual titanium content of the polymer obtained in each of Examples and Comparative Example described later were quantitatively determined by the fluorescent X-ray spectroscopy.

1. Apparatus

Magi X-PW2403, produced by Malvern Panalytical, Ltd., was used as a fluorescent X-ray apparatus, and PR gas (Ar/CH$_4$: 90/10) was used in measurement.

2. Method

A compressed plate having a diameter of approximately 45 mm and a thickness of 2 mm was produced form the specimen with a hot press molding machine (AJHC-37, produced by Oji Machine Co., Ltd.), and measured for the fluorescent X-ray intensity of the target element (i.e., residual aluminum or residual titanium) under the conditions shown in Table A below using the fluorescent X-ray apparatus, and the element concentration was obtained based on the calibration curve produced and registered in advance (the calibration curve herein was a calibration curve of the concentration of the standard specimen and the X-ray intensity). The measurement results are shown in Table 1 below.

TABLE A

| Measurement condition | | Residual aluminum | Residual titanium |
| --- | --- | --- | --- |
| X-ray tube | | SST-mAX | SST-mAX |
| Voltage | kV | 40 | 24 |
| Current | mA | 75 | 125 |

TABLE A-continued

| Measurement condition | | Residual aluminum | Residual titanium |
| --- | --- | --- | --- |
| Dispersive crystal | | LiF (200) | PE (002) |
| Detection mode | | Flow | Flow |
| 2θ | deg | 86.154 | 145.05 |

(2) Measurement Method of Triphenylmethane Amount 2 g of the polymer obtained in each of Examples and Comparative Example described later was extracted with 100 mL of chloroform under refluxing, and reprecipitated by adding 200 mL of methanol thereto. The solution was filtered, and the filtrate was evaporated to dryness, to which chloroform was added to make 5 mL of a solution. The specimen was measured by gas chromatography (Agilent 6850, produced by Agilent Technologies, Inc.) with a column BPX-5 (15 m×0.25 mm, membrane thickness: 0.25 μm) at an oven temperature raised from 100° C. (0 min) to 350° C. (10 min) at a rate of 10° C./min, with an injection temperature of 350° C., a detection temperature of 350° C., FID as a detector, He as a carrier gas, a linear velocity of 40 cm/sec, an injection amount of 1.0 μL, and a split of 1/10, so as to determine quantitatively the triphenylmethane amount. The measurement results are shown in Table 1 below.

(3) Heat Resistance Test

1. Production Method of Resin Composition for Injection Molded Article Used for Heat Resistance Test To 100 parts by weight of a composition containing 90% by weight of the syndiotactic polystyrene produced in each of Examples and Comparative Example described later and 10% by weight of a hydrogenated styrene thermoplastic elastomer SEBS (Septon 8006, produced by Kuraray Co., Ltd.), 3 parts by weight of maleic anhydride-modified polyphenylene ether (PPE), 0.6 part by weight of Irganox 1010 (produced by BASF SE), 0.6 part by weight of PEP-36 (produced by Adeka Corporation), and 0.6 part by weight of Sumilizer TP-D (produced by Sumitomo Chemical Co., Ltd.), as an antioxidant, 0.6 part by weight of Adeka Stab NA-11 (produced by Adeka Corporation) as a nucleating agent, and 0.3 part by weight of SH 200CV-13,000CS (produced by Dow Corning Toray Co., Ltd.) as a release agent were mixed and dry-blended with a Henschel mixer. Subsequently, the resin composition was kneaded with a twin screw extruder while side-feeding 30% by weight of glass fibers 03JA-FT164G (produced by Owens Corning Japan LLC), so as to produce pellets. The PPE used was produced by the method described in Example 2 (1) of WO 96/16997.

2. Production of Injection Molded Article Used for Heat Resistance Test

By using the pellets obtained in the item 1 above, a molded article as a test piece for ASTM D638 tensile test was obtained with an injection molding machine ES1000, produced by Nissei Plastic Industrial Co., Ltd. (resin temperature: 300° C., mold surface temperature: 150° C.).

3. Heat Resistance (Long-Term Heat Exposure) Test

The heat resistance against long-term heat exposure was measured according to JIS K7226:1998.

Specifically, the test piece obtained in the item 2 was subjected to an exposure treatment by placing the test piece in an oven at each of 150° C., 160° C., 170° C., and 180° C. for each of 4,000 hours, 3,000 hours, 1,500 hours, and 1,000 hours. The test piece was taken out from the oven every prescribed period of time at each of the exposure temperatures, and subjected to a tensile test, and the tensile strength retention rate before and after the exposure treatment was obtained. The tensile test was performed according to ASTM D638.

At each of the exposure temperatures, the measured values are plotted on the graph of the tensile strength retention rate as the ordinate and the treatment time as the abscissa to provide an approximate curve, and the breakage time was obtained from the intersection point of the approximate curve and the horizontal line showing a tensile strength retention rate of 50%.

The temperature index (TI) was obtained from the Arrhenius plot, in which the breakage times at the exposure temperature were plotted against the inverse of the exposure temperature. The temperature indices of Examples and Comparative Example obtained thereby are shown in Table 1. In the present invention, the case where the temperature index TI was lower than 125° C. was evaluated as no long-term heat resistance.

Examples 1 to 4 and Comparative Example

<Production Method of Styrene Resin>

The production method of the styrene resin of the present invention is specifically described.

A complete mixing tank reactor (inner diameter: 550 mm, height: 1,155 mm, inner capacity: 254 L) having a double helical blade having been cleaned was heated to 90° C. and dried in vacuum for 3 hours. Subsequently, after recovering the pressure of the reactor with nitrogen gas, the temperature thereof was decreased to 80° C. 60 kg of the SPS powder having been sufficiently dried by passing dried nitrogen gas therethrough was fed to the reactor, and further dried under a nitrogen stream for 2 hours. Subsequently, agitation was started, and the temperature inside the reactor was controlled to 70° C. Thereafter, the feed of the styrene monomer and the catalyst was started. The proportions of the catalysts, and the amount of hydrogen added are shown in Table 1 below. In the tables, "SM" shows the styrene monomer.

Simultaneous with the feed of the styrene monomer and the catalyst, the feed of n-pentane as an inert solvent to the reactor was started. n-Pentane was immediately evaporated to create a good fluidized state of the contents, together with the agitation with the double helical blade. The produced powder (SPS resin) was discharged intermittently from the bottom of the tank.

TABLE 1

|  |  | Example | | | | Comparative |
| --- | --- | --- | --- | --- | --- | --- |
|  |  | 1 | 2 | 3 | 4 | Example |
| Titanium species |  | A | A | A | A | A |
| (b1)/(b2) ratio |  | 1/1.2 | 1/1.2 | 1/1.2 | 1/1.2 |  |
| Catalyst ratio (A)/(C)/(E)/(D) |  | 1/50/25/0 | 1/50/25/0 | 1/50/25/0 | 1/50/25/0 | 1/75/25/0 |
| (b1)/Ti ratio |  | 4.44 | 4.08 | 3.51 | 3.03 |  |
| SM/Ti ratio |  | 77778 | 71429 | 61404 | 53030 | 43750 |
| Hydrogen/Ti ratio |  | 0.0 | 10.2 | 8.8 | 7.6 | 0.0 |
| Triphenylmethane amount | ppm by mass | 40 | 40 | 40 | 40 | 0 |
| Residual aluminum content | ppm by mass | 325 | 390 | 405 | 480 | 770 |
| Residual titanium content | ppm by mass | 7 | 8 | 10 | 11 | 15 |
| Temperature index of tensile strength in long-term heat resistance test | ° C. | 129 | 128 | 127 | 125 | 122 |

The following was understood from Comparative Example. The long-term heat resistance was deteriorated in the case where the metal content derived from the half metallocene transition metal compound (A), i.e., the titanium content, was outside the scope of the present application.

The catalyst species used are shown below.

Half metallocene catalyst (A): octahydrofluorenyl titanium trimethoxide
Compound (b1): triphenylmethanol
Compound (b2): triisobutylaluminum
Compound (C): methylaluminoxane
Compound (E): triisobutylaluminum
Compound (D): diisobutylaluminum hydride

The invention claimed is:

1. An injection molded article comprising a styrene resin having a syndiotactic structure, having a residual titanium content of 1.5 to 12 ppm by mass.

2. The injection molded article according to claim 1, wherein the injection molded article has a residual aluminum content of 70 to 800 ppm by mass.

3. The injection molded article according to claim 1, wherein the injection molded article comprises triphenylmethane.

4. The injection molded article according to claim 3, wherein the injection molded article comprises triphenylmethane in an amount of 10 ppm by mass or more.

5. The injection molded article according to claim 1, wherein the injection molded article further comprises an antioxidant.

6. The injection molded article according to claim 5, wherein the antioxidant contains at least one kind selected from a phosphorus antioxidant, a phenol-based antioxidant, an amine antioxidant, and a sulfur antioxidant.

7. A method for producing a styrene resin having a syndiotactic structure, comprising performing addition polymerization of one or more of a vinyl aromatic monomer in the presence of a catalyst containing a half metallocene transition metal compound (A) having at least one kind selected from metals of groups 3 to 5 of the periodic table and lanthanoid transition metals as a central metal, a compound (B) represented by the general formula (1), and a compound (C) selected from at least one kind of an oxygen-containing compound (c1) and a compound (c2) capable of forming an ionic complex through reaction with a transition metal compound, the styrene resin produced having a transition metal content derived from the half metallocene transition metal compound (A) of 1.5 to 12 ppm by mass:

wherein $R^1$ represents a halogen atom, an aliphatic hydrocarbon group having 1 to 30 carbon atoms, an aromatic hydrocarbon group having 6 to 30 carbon atoms, an alkoxy group having 1 to 30 carbon atoms, an aryloxy group having 6 to 30 carbon atoms, a thioalkoxy group having 1 to 30 carbon atoms, a thioaryloxy group having 6 to 30 carbon atoms, an amino group, an amide group, or a carboxy group, in which plural groups represented by $R^1$ may be the same as or different from each other, and plural groups represented by $R^1$ may be bonded to each other to form a ring structure depending on necessity; Q represents an element of group 14 of the periodic table; Y represents an element of group 16 of the periodic table; Z represents a metal element of groups 2 to 13 of the periodic table; $R^2$ represents a hydrocarbon group; j represents an integer of a valence number of the metal element Z; and k represents an integer of 1 to (j−1).

8. The method for producing a styrene resin having a syndiotactic structure according to claim 7, wherein the half metallocene transition metal compound (A) is represented by the following formula (2):

wherein $R^3$ represents a π ligand; M represents at least one kind selected from metals of groups 3 to 5 of the periodic table and lanthanoid transition metals; U represents a monoanion ligand, in which plural ligands represented by U may be the same as or different from each other, and plural ligands represented by U may be bonded to each other via an arbitrary group; L represents a Lewis base; a represents a valence number of M; and b represents 0, 1, or 2, in which in the case where L represents plural groups, the plural groups represented by L may be the same as or different from each other.

9. The method for producing a styrene resin having a syndiotactic structure according to claim 7, wherein the central metal of the half metallocene transition metal compound (A) is titanium.

10. The method for producing a styrene resin having a syndiotactic structure according to claim 9, wherein the transition metal content derived from the half metallocene transition metal compound (A) in the styrene resin produced is titanium.

11. The method for producing a styrene resin having a syndiotactic structure according to claim 7, wherein the method further uses a compound (D) represented by the following general formula (3) as a catalyst:

wherein $R^4$ and $R^5$ each represent an alkyl group having 1 to 8 carbon atoms; $X^1$ represents a halogen atom; and p and q satisfy 0<p≤2, 0≤q<2, and p+q≤2.

12. The method for producing a styrene resin having a syndiotactic structure according to claim 7, wherein the method further uses a compound (E) represented by the following general formula (4) as a catalyst:

wherein $R^6$ and $R^7$ each represent an alkyl group having 1 to 8 carbon atoms; $X^2$ represents a halogen atom; and m and n satisfy 0<m≤3, 0≤n<3, and m+n≤3.

13. The method for producing a styrene resin having a syndiotactic structure according to claim 7, wherein the compound (B) is represented by the general formula (1), wherein Z represents aluminum.

14. The method for producing a styrene resin having a syndiotactic structure according to claim 13, wherein the styrene resin has a residual aluminum content of 70 to 800 ppm by mass.

15. The method for producing a styrene resin having a syndiotactic structure according to claim 7, wherein the styrene resin is produced through powder bed continuous polymerization.

16. The method for producing a styrene resin having a syndiotactic structure according to claim 7, wherein hydrogen is added in an amount of 0 to 20-fold in terms of molar ratio based on the central metal of the half metallocene transition metal compound (A).

17. The method for producing a styrene resin having a syndiotactic structure according to claim 7, wherein the method does not include a decalcification treatment.

18. A molded article obtained by injection molding a styrene resin obtained by the production method according to claim 7.

* * * * *